Oct. 7, 1941.  E. M. HUNTER  2,258,248
PROTECTION OF ALTERNATING CURRENT ELECTRIC SYSTEMS
Filed March 1, 1940
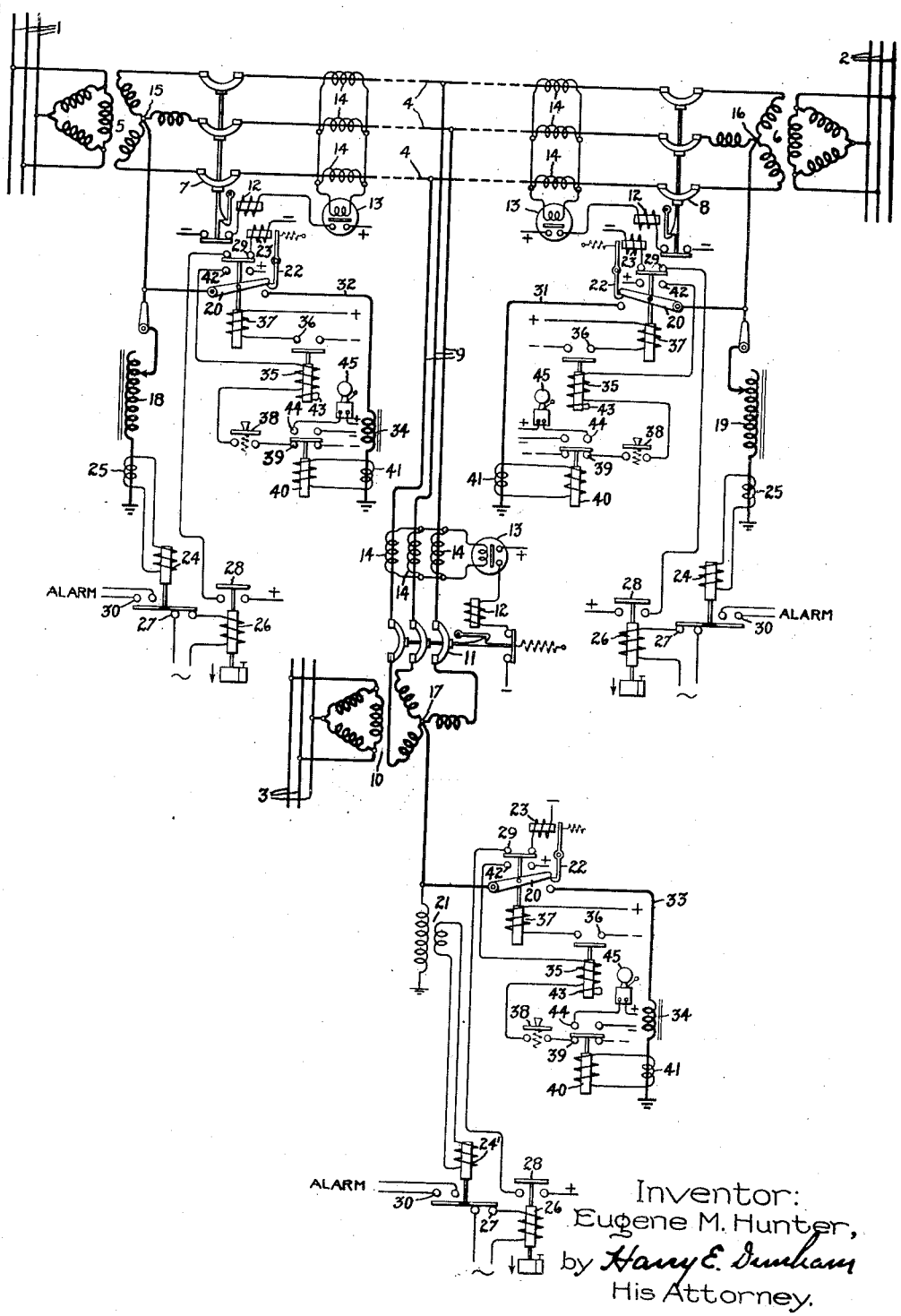
Inventor:
Eugene M. Hunter,
by Harry E. Dunham
His Attorney.

Patented Oct. 7, 1941

2,258,248

UNITED STATES PATENT OFFICE 2,258,248

PROTECTION OF ALTERNATING CURRENT ELECTRIC SYSTEMS

Eugene M. Hunter, Scotia, N. Y., assignor to General Electric Company, a corporation of New York Application March 1, 1940, Serial No. 321,723

5 Claims. (Cl. 175—294)

My invention relates to improvements in the protection of alternating current electric systems and more particularly to ground fault protection of alternating current electric systems of the type wherein a fault to ground on a phase conductor of the system substantially increases the capacitance current to ground of the ungrounded phase conductors of the system.

A large percentage of the faults on alternating current electric systems involves, initially at least, only a single conductor to ground. Most of these are of a transient or arcing character. It is, therefore, desirable whenever possible, to clear such faults without circuit breaker operations. Such arcing ground faults may be cleared by arc suppressing or ground fault neutralizing apparatus of the type disclosed in United States Letters Patent No. 1,537,371, issued May 12, 1925. Such apparatus by itself is effective only on alternating current electric systems of the type wherein a fault to ground on a phase conductor of the system substantially increases the capacitance current to ground of the ungrounded phase conductors of the system.

In such systems it is impractical in case of faults which the ground fault neutralizer cannot suppress, to secure that selectivity of relay operation which will, in case of such faults, disconnect only the faulty portion of the system and yet maintain continuity of service on sound portions. This is in part due to insufficient fault current to insure the necessary discrimination within the sensitivity limits of the relays. Moreover, when selectivity is based on the use of ground fault directional relays, the variation in power factor at any point of the system, in dependence on the location of the fault, even though the power factor may change in sign, is so small that it precludes the use of prearranged relay settings suitable for selective operation regardless of the fault location.

However, if a system is so arranged that one or more of its neutral points may be grounded to accord with a prearrangement of relay settings, then selectivity can be obtained because the factors which militate against the desired relay operation may be eliminated by the grounding of the system. In other words, the system set up, as far as the flow of ground fault current is concerned, is practically that for which prearranged settings within the discriminating ability of the relays are determined since there is usually plenty of fault current with a large power factor variant for different fault locations.

Accordingly, if after a predetermined time sufficient for the ground fault neutralizer to clear a transient fault, the fault still exists, it is desirable to put the system grounding connections in condition to correspond with the prearranged selectivity of the ground fault relays so that they may have an opportunity to clear the fault. In some cases, depending in part on the type of switching means used to establish the grounding connections, it is necessary to prevent the opening of the grounding switch as long as current is flowing in the grounding connection which the switch completes.

One object of my invention is to provide an improved protective arrangement whereby, in case of failure of the ground fault neutralizing means to clear a transient fault within a predetermined time, there is effected a predetermined grounding of the system such that its ground fault relays may function selectively in accordance with prearranged settings based on such grounding. Another object of my invention is to provide an improved protective arrangement such that a grounding switch cannot be opened while current is flowing in the ground connection established by the switch. These and other objects of my invention will hereinafter appear in more detail.

My invention will be better understood from the following description when considered in connection with the accompanying drawing, and its scope will be pointed out in the appended claims.

The single figure of the accompanying drawing illustrates an embodiment of my invention as applied to a three-phase alternating current electric power system including three interconnected stations which are indicated by busses 1, 2 and 3, respectively. Stations 1 and 2 are interconnected by a tie line 4 through power transformers 5 and 6 and suitable circuit interrupting means, such for example as latched closed circuit breakers 7 and 8, and the station 3 is connected to the line 4 by tie line 9 through a power transformer 10 and suitable circuit interrupting means, such as a latched closed circuit breaker 11. The tie line 4 is shown partly in broken lines merely to give a concept of distance. It will, of course, be understood that the power system may extend beyond any one or more of the stations 1, 2 and 3, but I have illustrated only so much of the system as is necessary to an understanding of my invention.

For controlling the opening of the circuit breakers 7, 8 and 11 through their trip coils 12 suitable relaying means responsive to ground faults are provided. As illustrated, these relaying means comprise simple over-current relays 13. These may be of the induction disk time limit type, examples of which are well known to the art. For more selective action, the ground fault responsive relays may be of the two-coil directional type, examples of which are also well known to the art. For response to ground faults the relays 13 may be connected to be energized in accordance with the sum of the currents in the line conductors at the relay location. This may be done by connecting the windings of the relays 10 across parallel connected current transformers 14.

The power transformers 5, 6 and 10 are shown as having Y connected windings in their respectively associated lines to provide neutral points 15, 16 and 17 which may be used for grounding purposes but neutral points otherwise suitably derived may be used. The neutral points 15, 16 and 17 are, in accordance with my invention, arranged to be connected to ground to establish a predetermined grounding of the system to accord with the prearranged settings of the ground fault relays so as to insure the desired selectivity of relaying operation. Inasmuch, however, as it is desirable to clear as many ground faults as possible without circuit breaker operation, at least one and possibly more of the neutral points, such for example as 15 and 16, depending on the extent of the system and also whether or not it may at times be operated as a divided system, are grounded through suitable arc suppressing apparatus, such as ground fault neutralizers 18 and 19, respectively, after the manner and for the purpose disclosed in the previously mentioned United States Letters Patent No. 1,537,371. Each of the ground fault neutralizers 18 and 19 is an inductance device whose zero phase sequence inductance is such as to provide, on the occurrence of a ground on a phase conductor of the system, a lagging current for effectively suppressing all or part of the capacitance current to ground at the fault. Thus, for example, assuming the circuit breaker 8 of the system is open, then the ground fault neutralizer 18 would be proportioned, for example, to suppress the capacitance current in the portion of the system to the left and below the circuit breaker 8 while the ground fault neutralizer 19 would be proportioned to suppress the capacitance current of the portion, not shown, of the system to the right of the circuit breaker 8. Then, if the circuit breaker 8 were connected to include all of the system covered by the neutralizers 18 and 19, the two together would provide the necessary lagging current for the whole system in case of ground faults. Thus in case of arcing grounds or transient faults on the system involving, for example, a phase conductor of the line 4 to ground, one or both of the ground fault neutralizers 18 and 19, depending on the amount of the system in service, come into action. Immediately enough lagging current is caused to flow to neutralize the capacitance current to ground of the ungrounded phase conductors of the system, and the fault, if of a transient character, is eliminated.

When the fault is not of a transient character, however, resort may be had to circuit breaker operation so as to isolate the faulty portion of the system without disturbing continuity of service on sound portions. It is then necessary to rely upon the ground fault relays 13, but their action, as heretofore pointed out, can only be selective for that predetermined grounding of the system for which prearranged relay settings are made.

Accordingly, I arrange to effect this grounding a predetermined time after the appearance of a fault, in other words, after a time sufficient for the ground fault neutralizers to suppress the fault if of a transient character. Thus at stations 1 and 2, I arrange to establish a connection to ground around the ground fault neutralizers 18 and 19, respectively, and at station 3 to establish a connection to ground from the neutral point 17 of the power transformer 10. These connections to ground may be established in any suitable manner, but I propose to accomplish them by closing a normally open switching means 20 a predetermined time after the beginning of current flow in the ground fault neutralizers 18 and 19 at the stations 1 and 2, respectively, and in a potential transformer 21 connected between the neutral point 17 and ground at the station 3. As illustrated, the switching means 20 is of the disconnecting blade type and is held in the switch open position by a spring biased latch 22 the release of which permits the closing of the switch either by gravity or spring means, not shown, or both. The release of the latch 22 may be effected by the energization of a trip coil 23.

For controlling the energization of the trip coils 23 so as to insure the closing of the switch 20 a predetermined time after the appearance of a ground fault which is not cleared by the ground fault neutralizers, there may be employed at stations 1 and 2 suitable relay means 24 which are respectively connected to be responsive to the current flowing in the ground fault neutralizers at these stations. For this purpose they may be connected in circuit with current transformers 25 in the neutralizer connections to ground. At the station 3 a voltage relay 24' may be employed so that it will be connected to be energized in accordance with the voltage to ground on the potential transformer 21. Where there are no ground fault neutralizers as at station 3, the ground fault detector relay 24' may also be energized in accordance with the zero phase sequence voltage as by a wye open-delta potential transformer connected to the line 9 in a manner well known to the art. While the desired time delay may be incorporated in the relays 24, I have found it more practical to incorporate the time delay in a separate time delay relay 26 which is under the control of the relay 24 through the circuit opening contacts 27 thereof.

It will be apparent to those skilled in the art that, if the times of operation of the relays 26 at the different stations were to differ by the time it takes to close one of the switches 20, then the closing of any one of these switches, to ground its associated neutral point, would tend so to alter the flow of current in the current to ground or the voltage to ground from the other neutral points as to interfere with, or possibly prevent, the closing of the switches 20 at such points. Undervoltage relays and particularly those of the induction disk time limit type are, in general, sufficiently accurate for the purpose although other arrangements, suitable to the speed of the switch closing operation, may be used without departing from the spirit of my invention. Thus, for example, the normally closed contacts 27 of the relays 24 keep the relays 26 energized with their movable contact 28 in the open circuit position in series with the trip coil 23 of the switch 20. Consequently, the opening of the contacts 27 in response to the operation of the relay 24 effects the deenergization of the relay 26 which, after the expiration of its time limit, completes the circuit of the trip coil 23 after a predetermined time to effect the closing of the switch 20. Each of the switches 20 may be provided with *b* auxiliary switch contacts 29 to break the circuit of the trip coil 23. In addition to the circuit opening contacts 27, the relay 24 may be provided with circuit closing contacts 30 which effect the energization of a suitable alarm to indicate the presence of a fault.

While the connection to ground 31 through the switch 20 at station 2 may include no impedance, as shown, the connection 32 at station 1 and the connection 33 at station 3 may include suitable impedance devices 34 depending upon the distribution of ground fault current flow desired for the prearranged relay settings which give the desired selectivity.

Since it is necessary, after the clearing of a fault by the ground fault relays, to restore the system to neutralizer operation, I provide means for reopening the switches 20 to eliminate the grounding connections 31, 32 and 33. If the switches 20 are of the disconnecting type illustrated, they are not usually capable of interrupting any great amount of current. Consequently, the means, which I provide for reopening the switches 20, is inoperative as long as there is any current flowing in the ground connection of the respective switch 20. In order to effect the reopening under the desired conditions, I provide an opening relay 35 which is arranged through its circuit closing contacts 36 to complete the circuit of the opening coil 37 of the switch 20. For controlling the operation of the relay 35, I connect the winding thereof in a circuit including a switch 38, which may be manually operative, and in series therewith the normally closed contacts 39 of the relay 40 which is connected to respond to the current flowing in the ground connection. It may be connected to a current transformer 41, as shown. The circuit of the opening relay 35 may also include the *a* auxiliary switch contacts 42 of the switch 20 for the purpose of interrupting the inductive circuit of the relay 35. This relay may have a time delay drop out in order to allow time for latching the switch 20 in the open position. The time delay is indicated as being obtained by a short-circuited winding 43. The grounding connection relay 40 may also have circuit closing contacts 44 for energizing a suitable alarm device, such as a bell 45, to indicate when current is flowing in the ground connection with which the particular alarm device is associated.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In an alternating current electric system having a neutral point and of the type in which a fault to ground on one phase conductor of the system substantially increases the capacitance current to ground of the ungrounded phase conductors of the system, a connection to ground from said neutral point having a zero phase sequence inductance operative on the occurrence of a ground on a phase conductor of the system to provide a lagging current for effectively suppressing the capacitance current to ground at the grounded point, means operative in dependence on the current in said neutral to ground connection including switching means for establishing a predetermined time after the occurrence of the ground another connection between said neutral point and ground, and means for preventing an interruption of said other neutral to ground connection as long as current flows therein comprising relaying means connected to respond only to the current through said switching means in said other neutral to ground connection.

2. In an alternating current electric system having a plurality of neutral points at least one of which has a connection to ground with a zero phase sequence inductance operative on the occurrence of a ground on a phase conductor of the system to provide a lagging current for effectively suppressing the capacitance current to ground at the grounded point when no other neutral point of the system is substantially grounded and the neutral points without said zero phase sequence inductance connection being ungrounded, means operative in dependence on the current in said neutral to ground connection for establishing a predetermined time after the occurrence of the ground another connection to ground from said one neutral point, means operative on the occurrence of said ground on a phase conductor of the system for establishing in said predetermined time after the occurrence of the ground a connection to ground from at least one of the ungrounded neutral points of the system, and means for preventing an interruption of the respective connections as long as current flows therein comprising means operative in dependence on the respective currents flowing in said grounding connections.

3. In an alternating current electric system having a plurality of neutral points and of the type in which a fault to ground on one phase conductor of the system substantially increases the capacitance current to ground of the ungrounded phase conductors of the system, protective means at different points of the system for selectively isolating a portion of the system on the occurrence of a ground fault on said portion including relays set to respond to a fault between a phase conductor of the system and ground on the basis of a predetermined grounding of said neutral points, a connection to ground from at least one of said neutral points having a zero phase sequence inductance operative on the occurrence of a ground on a phase conductor of the system to provide a lagging current for effectively suppressing the capacitance current to ground at the grounded point, and the neutral points without such zero phase sequence inductance connection being ungrounded, means operative in dependence on the current in said neutral to ground connection for establishing a predetermined time after the occurrence of the ground fault another connection to ground from said one neutral point, and means operative on the occurrence of the ground on a phase conductor of the system for effecting in said predetermined time thereafter the ground connections of the ungrounded neutrals necessary to establish said predetermined grounding of the neutral points whereby to give said ground fault responsive relays an opportunity to clear the ground fault if it has not been suppressed by said zero phase sequence inductance connection.

4. In an alternating current electric system having a plurality of neutral points and of the type in which a fault to ground on one phase conductor of the system substantially increases the capacitance current to ground of the ungrounded phase conductors of the system, protective means at different points of the system for selectively isolating a portion of the system on the occurrence of a ground fault on said portion including relays set to respond to a fault between a phase conductor of the system and ground on the basis of a predetermined grounding of said neutral points, a connection to ground from at least one of said neutral points having a zero phase sequence inductance operative on the occurrence of a ground on a phase conductor of the system to provide a lagging current for effectively suppressing the capacitance current to ground at the grounded point and the neutral points without such zero phase sequence inductance connection being ungrounded, means operative in dependence on the current in said neutral to ground connection for establishing a predetermined time after the occurrence of the ground fault another connection to ground from said one neutral point, means operative on the occurrence of the ground on a phase conductor of the system for effecting in said predetermined time thereafter the ground connections of the ungrounded neutrals necessary to establish said predetermined grounding of the neutral points whereby to give said ground fault responsive relays an opportunity to clear the ground fault if it has not been suppressed by said zero phase sequence inductance connection, and means for preventing an interruption of the connections as long as current flows therein comprising means operative in dependence on the respective currents flowing in said neutral to ground connections.

5. In an alternating current electric system having a plurality of neutral points and of the type in which a fault to ground on one phase conductor of the system substantially increases the capacitance current to ground of the ungrounded phase conductors of the system, protective means for clearing system ground faults including relays set to respond to a fault between a phase conductor of the system and ground on the basis of a predetermined grounding of said neutral points, a connection to ground from at least one of said neutral points having a zero phase sequence inductance operative on the occurrence of a ground on a phase conductor of the system to provide a lagging current for effectively suppressing the capacitance current to ground at the grounded point and the neutral points without such zero phase sequence inductance connection being ungrounded, means operative in dependence on the current in said neutral to ground connection for establishing a predetermined time after the occurrence of the ground fault another connection to ground from said one neutral point, and means operative on the occurrence of the ground for effecting in said predetermined time thereafter the other ground connections of the ungrounded neutrals necessary to establish said predetermined grounding of the neutral points for which said relays are set to respond whereby to give the relays an opportunity to clear the ground fault if it has not been suppressed by said zero phase sequence inductance connection.

EUGENE M. HUNTER.